US010351971B2

(12) United States Patent
Chou et al.

(10) Patent No.: US 10,351,971 B2
(45) Date of Patent: Jul. 16, 2019

(54) METHOD OF PREPARING NATURAL GRAPHENE CELLULOSE BLENDED FIBER

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW); Shao-Hua Chou, Taichung (TW); Chia-Yu Hsu, Taichung (TW)

(73) Assignee: ACELON CHEMICALS AND FIBER CORPORATION, Changhua County (TW)

( * ) Notice: Subject to any disclaimer, the term of this patent is extended or adjusted under 35 U.S.C. 154(b) by 198 days.

(21) Appl. No.: 15/279,497

(22) Filed: Sep. 29, 2016

(65) Prior Publication Data

US 2017/0107643 A1    Apr. 20, 2017

(30) Foreign Application Priority Data

Oct. 20, 2015  (TW) .............................. 104134348 A (51) Int. Cl.
| | |
|---|---|
| D01D 1/02 | (2006.01) |
| D01F 1/10 | (2006.01) |
| D01F 2/00 | (2006.01) |
| C01B 32/23 | (2017.01) |
| C01B 32/192 | (2017.01) |
| C01B 32/194 | (2017.01) |

(52) U.S. Cl.
CPC ............. D01D 1/02 (2013.01); C01B 32/192 (2017.08); C01B 32/194 (2017.08); C01B 32/23 (2017.08); D01F 1/10 (2013.01); D01F 2/00 (2013.01)

(58) Field of Classification Search
None
See application file for complete search history.

(56) References Cited

U.S. PATENT DOCUMENTS

| | | | |
|---|---|---|---|
| 4,895,712 | A | 1/1990 | Komine et al. |
| 6,524,501 | B1 | 2/2003 | Arai et al. |
| 8,127,575 | B2 | 3/2012 | Burrow et al. |
| 2014/0004344 | A1 | 1/2014 | Kim et al. |

*Primary Examiner* — Jacob T Minskey
(74) *Attorney, Agent, or Firm* — Bacon & Thomas, PLLC (57) ABSTRACT

This application describes a method of preparation of a natural graphene cellulose blended fiber, which comprises using a graphite powder as a raw material for preparing a graphene solution, adding the graphene solution to a slurry formed by mixing and dissolving a wood pulp with N-methylmorpholine N-oxide (NMMO), removing the water content thereof to form a spinning dope, and then spinning the spinning dope by a Dry-Jet Wet method to manufacture a natural graphene cellulose blended fiber. The present method does not require a highly toxic hydrazine hydrate solution. Further, by increasing the adding ratio of the graphene solution in the manufacturing process, control of the antistatic properties and thermal transferring functions can be achieved, and thereby various requirements of different consumers can be satisfied. Besides, the fibers can decompose naturally after being used, and thus the product is harmless, natural, and environmentally friendly.

7 Claims, 4 Drawing Sheets

METHOD OF PREPARING NATURAL GRAPHENE CELLULOSE BLENDED FIBER

FIELD OF THE PRESENT INVENTION

The present invention relates to a method of preparing natural graphene cellulose blended fiber which is a green environmental process in the technology field of manufacturing natural cellulose fibers. The method includes using graphite powder as a raw material for preparing a graphene solution, adding the graphene solution into a slurry formed by mixing and dissolving wood pulp with N-methylmorpholine N-oxide, and removing water content from the slurry to form a spinning dope, and then spinning the spinning dope to manufacture a natural graphene cellulose fiber. The fiber can naturally decompose if discarded after being used, and is harmless to the natural environment, thus it is an environment friendly fiber.

BACKGROUND OF THE INVENTION

Graphite is a layered material formed by carbon atoms stacked in orderly layers in a two-dimensional planar network. Since the force between the stacked carbon layers is relatively weak, a graphite layer can be easily peeled off from other layers to form a thin layer graphite sheet. Graphene is one atomic layer of graphite.

Graphene was first explored in 1947, by P. R. Wallace who calculated the electronic structure of graphene, and found its unique linear dispersion properties. However, for a long time scientists suspected that graphene may not exist in reality, since a two-dimensional planar atomic layer was considered as a part of a three-dimensional structure hat cannot stably exist alone. Therefore, graphene was considered a hypothetical structure useful only as a model for description of the physical properties of carbon materials. In 2010, Professor Andre Geim and his student Kostya Novoselov were awarded the Nobel Prize in Physics for their innovative research related to graphene.

Because graphene is non-toxic, and has excellent chemical and thermal properties, including good thermal conductivity, high mechanical strength and other useful characteristics, graphene-based materials have been widely used in various industrial fields, especially the textile field. For example, Chinese Patent No. CN103046151 discloses "Graphene-regenerated cellulose blended fiber and preparation method thereof". According to the preparation method described in CN103046151, a graphene oxide solution is mixed with a regenerated cellulose solution to obtain "an intermediate of a graphene-regenerated cellulose blended fiber" through a viscose spinning process, and finally a product of graphene-regenerated cellulose blended fiber is thus manufactured through a reduction step of "intermediate of a graphene-regenerated cellulose blended fibers", wherein in the reduction step, hydrazine hydrate solution with a mass concentration of 1% is selected as a reductant, then at conditions of 20° C., a graphene-regenerated cellulose blended fiber is added in the hydrazine hydrate solution in the bath ratio of 1:100 to reduction for 120 min., and after washing by water and drying, a graphene-regenerated cellulose blended fibers is thus obtained.

As is well known, a hydrazine hydrate solution is a colorless and transparent oily fuming liquid, smells of ammonia, will smoke in humid air and has strong alkalinity and moisture absorption, as well as being classified as a highly toxic substance. It will burn, if exposed to fire or heat. It will cause an explosion, if inadvertently brought into contact with an oxidizing agent. In addition, if a hydrazine hydrate solution is absorbed by a human through, for example, inhalation, ingestion or absorption through the skin, it will be harmful to human health. Repeated skin contact with hydrazine hydrate solution over a long period of time could poison a person working with the solution, such as the operator of the method described in CN103046151, potentially causing dizziness, nausea and other symptoms. Accordingly, the method described in CN103046151, which uses hydrazine hydrate solution as a reductant for reducing "intermediate of a graphene-regenerated cellulose blended fibers" to produce "graphene-regenerated cellulose blended fibers" may be an unsafe process with high risk that is dangerous to an operator.

The present Applicants have filed a number of patent applications related to methods of preparing natural cellulose fibers which are harmless to the natural environment, such as patents approved and granted as TW 1392779, TW 1392780 and TW 1392781. These methods use manufacturing processes and conditions that are safe and do not harm the health of operators. Achieving a method of preparing natural graphene cellulose blended fiber appears to be urgent and necessary in this technical field.

SUMMARY OF THE INVENTION

The present application describes a method of preparing natural graphene cellulose blended fiber, which comprises the following steps:

(a) combining a graphite powder with a solution comprising 1 to 10 wt % of a first compound selected from the group consisting of sulfuric acid ($H_2SO_4$), hydrochloric acid (HCl), perchloric acid ($HClO_4$), hydrogen iodide (HI), hydrofluoric acid (HF), and nitric acid ($HNO_3$), then stirring for 30 minutes in an ice bath environment;

(b) adding a solution comprising 1 to 10 wt. % potassium permanganate ($KMnO_4$) to the product of step (a), stirring for 1 to 2 hours, and adding distilled water, wherein the potassium permanganate solution is added until none of the purple smoke generated by reacting with the potassium permanganate is formed from the distilled water;

(c) adding a solution comprising 1 to 10 wt. % hydrogen peroxide ($H_2O_2$) to the product of step (b), wherein the hydrogen peroxide solution is added until no bubbles are formed and the solution becomes dark green, then filtering the dark green solution into a cake;

(d) rinsing the cake of step (c) with a solution comprising 5 to 10 wt. % hydrochloric acid to remove sulfate ions, then washing the cake with distilled water;

(e) drying the product of step (d) at 40 to 60° C. for 24 to 48 hours to obtain dried solid graphite oxide;

(f) adding distilled water to the dried solid graphite oxide of step (e), wherein the distilled water is added up to 200 mls per 0.06 g to 1.0 g of the dried solid graphite oxide, then treating by ultrasonic vibration for 30 to 60 minutes to obtain a graphite oxide solution having a graphite oxide concentration of 0.03 to 0.5 wt. %;

(g) adding a solution comprising 1 wt. % to 10 wt. % of a second compound selected from the group consisting of sodium borohydride ($NaBH_4$), potassium borohydride ($KBH_4$), lithium aluminum hydride ($LiAlH_4$), and sodium citrate ($C_6H_5Na_3O_7$) to the graphite oxide solution of step (f), then treating by ultrasonic vibration for 30 to 60 minutes;

(h) filtrating the product of step (g), washing the filtrate with water 3 to 5 times to remove the sodium borohydride, potassium borohydride, lithium aluminum hydride, or sodium citrate, then back-filtrating to obtain a graphene solution;

(i) adding the graphene solution of step (h) to a slurry solution formed by mixing a pulp with N-methylmorpholine N-oxide (NMMO) and a stabilizer in an expansion dissolving tank, then mixing at 60 to 80° C., wherein the graphene solution is added in a ratio of 0.11 wt. % to 5.0 wt. %, the pulp is selected from the group consisting of wood pulp, cotton pulp, bamboo pulp, and a mixture of cotton and bamboo pulp, the pulp comprises α-cellulose in an amount of 65% or more having a polymerization degree of 500 to 1500, and the NMMO has a concentration of 50 to 78%;

(j) removing water from the product of step (i) using a Thin Film Evaporator (TFE) and heating at 80 to 130° C., wherein the water is removed to 5% to 13% within 5 minutes and the cellulose is dissolved to form a spinning dope;

(k) spinning the spinning dope of step (j) using a Dry-Jet Wet Spinning method, which comprises pressuring the spinning dope by a metering pump, filtering and degassing by a continuous filter (CPF), transporting the spinning dope into a spinning tank, forming a thin molten stream of the spinning dope by passing the spinning dope through a spinning orifice, then extruding the spinning dope through an air gap to form air-cured fibers;

(l) delivering the air-cured fibers of step (k) into a coagulation bath, then regenerating and washing the fibers, wherein the coagulation bath has a concentration of 4.5 to 8.0%, and the amount of residual NMMO solvent remaining after washing is less than 0.1%; and (m) drying, oiling and winding the product of step (l) to form natural graphene cellulose blended fibers.

The present method does not require a reduction process, or use of the highly toxic hydrazine hydrate solution which is generally required in a reduction process, thus avoiding the health hazards associated with hydrazine hydrate solutions.

Furthermore, the antistatic property and thermal conductivity of the present natural graphene cellulose blended fiber can be altered by adjusting the ratio of the graphene solution to the wood pulp solution in the manufacturing process to satisfy different consumers. Finally, the present fiber is harmless, natural, and environmentally friendly, at least because it can decompose naturally when it is disposed of after being used.

DETAILED DESCRIPTION OF THE PREFERRED EMBODIMENTS

To further illustrate the preparation process and the effectiveness of the present invention, it is described in detail with reference to drawings and various test examples as follows.

Figure 1:
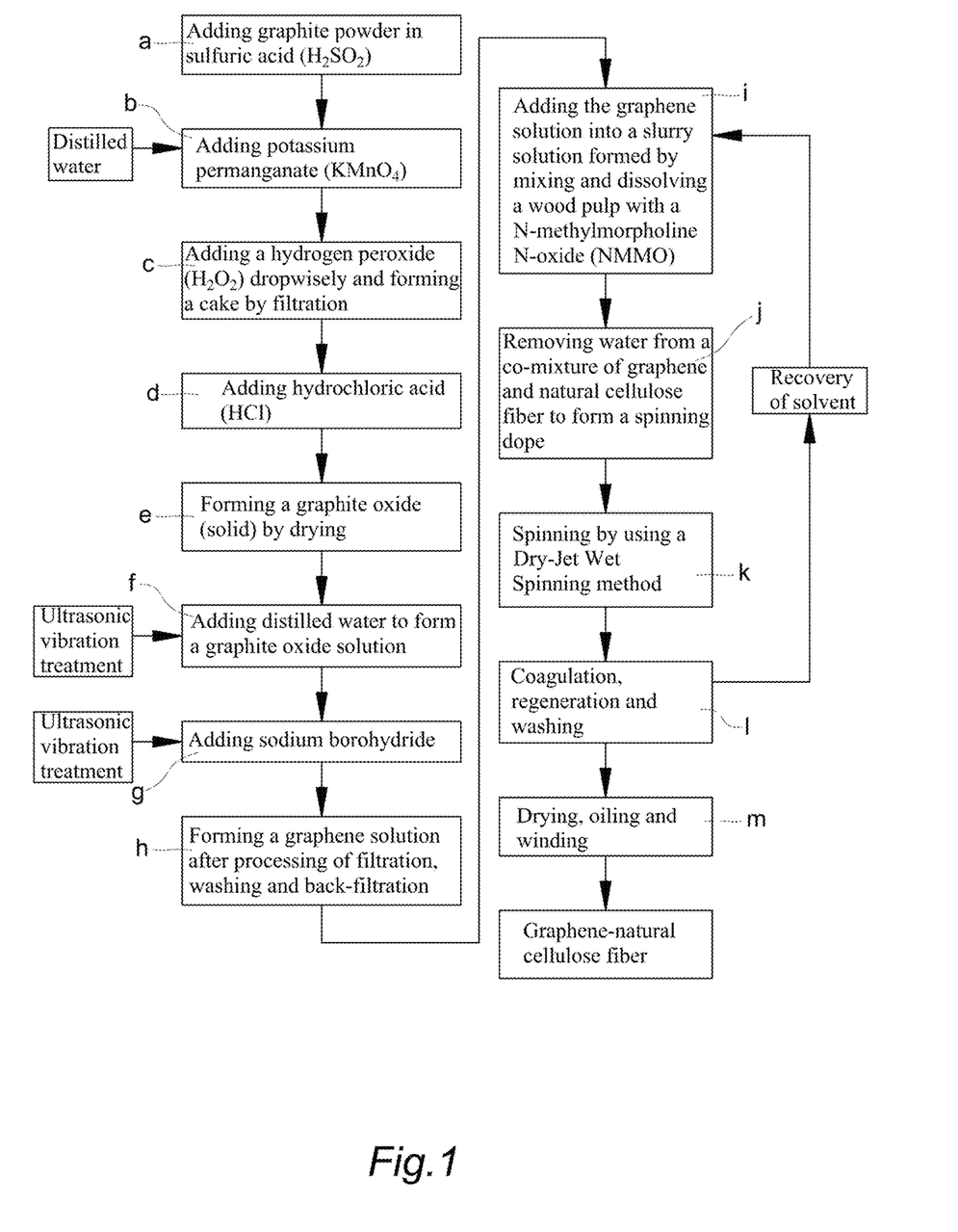
FIG. 1 is a block diagram showing the manufacturing process of the present invention.
Figure 2:
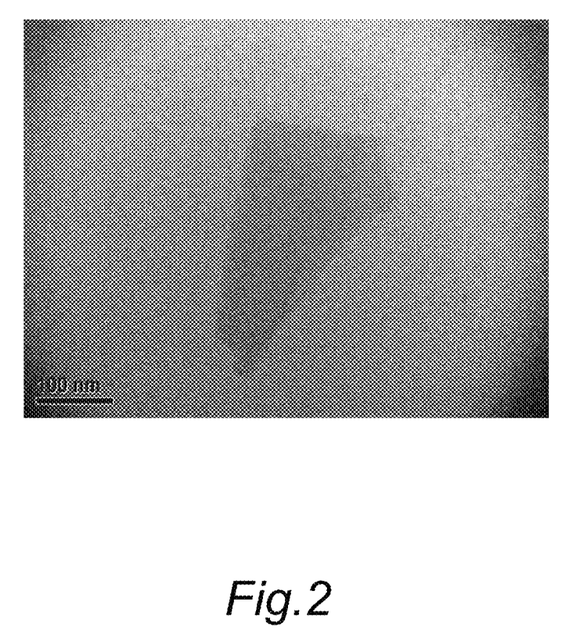
FIG. 2 is an electron microscope (TEM) image (100×) of the graphene prepared by the process according to the present invention.
Figure 3:
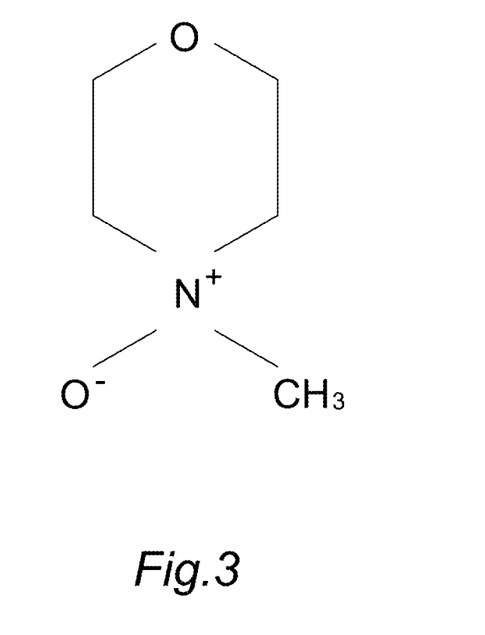
FIG. 3 shows a chemical structure of N-methylmorpholine N-oxide (referred to as NMMO) solvent, which is used in the present invention.
Figure 4:
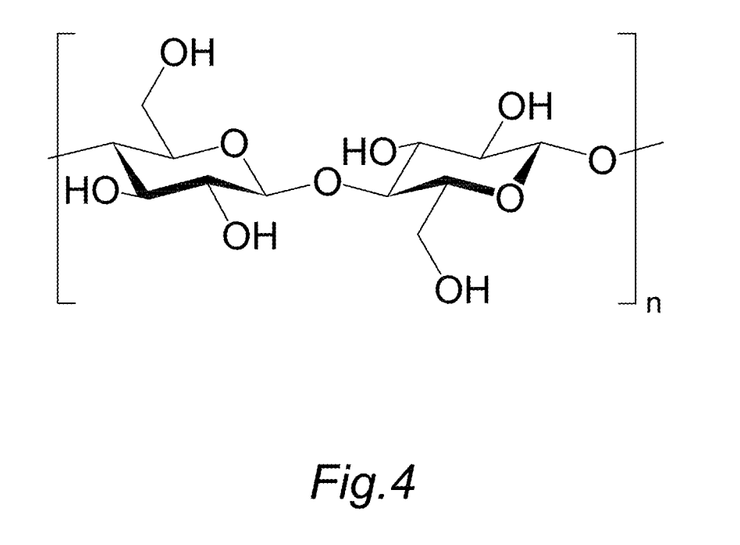
FIG. 4 shows a chemical structure of wood pulp cellulose, which is used in the present invention.

Please refer to FIGS. 1 to 4. The present invention provides a "method of preparing natural graphene cellulose blended fiber", which comprises the following steps:

(a) Adding sulfuric acid ($H_2SO_4$) in a graphite powder, which comprises pouring sulfuric acid with a concentration of 1 wt. % to 10 wt. % into a container comprising graphite powder, and then stirring for 30 minutes in an ice bath environment;

(b) Adding potassium permanganate ($KMnO_4$), which comprises: adding potassium permanganate having a concentration of 1 wt. % to 10 wt. % into the mixture obtained from step (a), stirring for 1 to 2 hours, and adding an appropriate amount of distilled water, where the potassium permanganate is continuously added until none of the purple smoke generated by reacting with the potassium permanganate, is formed from the di stilled water;

(c) Adding hydrogen peroxide ($H_2O_2$) and conducting a filtration, which comprises: dropwisely adding a hydrogen peroxide solution with a concentration of 1 wt. % to 10 wt. % to the solution obtained from step (b), where bubbles are formed in the solution from step (b) during the hydrogen peroxide-adding period, and the addition of hydrogen peroxide proceeds continuously until no more bubbles are formed and the solution changes to a dark green solution; and then filtering the dark green solution into a cake;

(d) Rinsing the cake with hydrochloric acid and washing the cake with water until it becomes neutral, which comprises rinsing the cake with 5.0% to 10.0% of HCl to remove sulfate ions, and then washing the cake with distilled water until it becomes neutral;

(e) Drying the cake to form a solid graphite oxide, which comprises drying the cake in an oven at 40 to 60° C. for 24 to 48 hours to obtain a dried solid graphite oxide;

(f) Adding distilled water to form a graphite oxide solution, which comprises adding 0.06 g to 1.0 g dried graphite oxide into a container, adding distilled water to 200 ml, and then treating the graphite oxide and distilled water mixture by ultrasonic vibration for 30 to 60 minutes to obtain a graphite oxide solution, which has a concentration of 0.03 wt. % to 0.5 wt. % graphite oxide;

(g) Adding sodium borohydride ($NaBH_4$) to the graphite oxide solution of step (f) to form a sodium borohydride containing graphene solution, which comprises adding 0.06 g to 1.0 g of sodium borohydride ($NaBH_4$) with a concentration of 1 wt. % to 10 wt. % into the a graphite oxide solution of step (f) and then treating it by ultrasonic vibration for 30 to 60 minutest to obtain a sodium borohydride containing graphene solution;

(h) Conducting filtration, water-washing and back-filtration to form a graphene solution, which comprises firstly filtrating the sodium borohydride containing graphene solution of step (g) by filter paper, then after the filtration is finished, washing it with water 3 to 5 times to remove sodium borohydride, and finally back-filtrating the filter paper to obtain a graphene solution; wherein as shown in FIG. 2, the obtained graphene solution can be dropped onto copper-made mesh and after it is dried, and observed by TEM tests. Upon TEM testing, slight wrinkles can be found in the surface of graphene, while when the color is more light this demonstrates a small number of graphene layers and a state with a large area, in addition it can be observed that the graphene area is up to 1.0×1.0 µm2;

(i) Adding the graphene solution of step (h) into a slurry solution formed by mixing and dissolving a wood pulp with a N-methylmorpholine N-oxide (NMMO), which comprises firstly cutting a raw material of wood pulp into small pieces, combining the cut wood pulp together with NMMO (of which the chemical structure is the same as shown in FIG. 3) and a stabilizer in an expansion dissolving tank, and mixing and stirring the wood pulp and NMMO combination at a temperature of 60 to 80° C., where the tank is equipped with a vacuum condensation device for removing water, the graphene solution is added in a ratio of 0.11 wt. % to 5.0 wt. %, the raw wood pulp is a long-fiber pulp (soft wood pulp), a short-fiber pulp (hard wood pulp), or a combination thereof, and the wood pulp has a polymerization degree of 500 to 1500 and has α-cellulose in an amount of 65% or more, of which the chemical structure is the same as shown in FIG. 4; and the NMMO has a concentration of 50% to 78%;

(j) Removing water from the product of step (i) to form a spinning dope, which comprises removing surplus water content by using a Thin Film Evaporator (TFE), and heating at 80 to 130° C. so that the water is removed to 5% to 13% within 5 minutes, thereby the cellulose is dissolved to form a spinning dope;

(k) Spinning the spinning dope of step (j) by using a Dry-Jet Wet Spinning method, which comprises pressuring the spinning dope by a metering pump, transporting the spinning dope into a spinning tank after filtration and degassing by a continuous filter (CPF), forming a thin molten stream of the spinning dope by passing the spinning dope through a spinning orifice, and extruding the spinning dope through an air gap to form air-cured fibers;

(l) Delivering the air-cured fibers of step (k) into a coagulation bath to coagulate and regenerate the fibers, where the coagulation bath has a concentration of 4.5% to 8.0%, followed by washing the fibers, where the amount of the residual NMMO solvent remaining after washing, is less than 0.1%; and (m) Drying, oiling and winding the washed fibers of step (l) to produce a natural graphene cellulose blended fiber.

In the present method, the sulfuric acid of step (a) may be changed to hydrochloric acid (HCl), or perchloric acid ($HClO_4$), or hydrogen iodide (HI), or hydrofluoric acid (HF), or nitric acid ($HNO_3$), and of which each has a concentration of 1 wt. % to 10 wt. %; and the sodium borohydride ($NaBH_4$) of step (g) may be changed to potassium borohydride ($KBH_4$), or lithium aluminum hydride ($LiAlH_4$), or sodium citrate ($C_6H_5Na_3O_7$), and of which each has a concentration of 1 wt. % to 10 wt. %.

The raw wood pulp of step (i) may be changed to cotton pulp, or bamboo pulp, or a mixture of both of the cotton pulp and the bamboo pulp, each of which each has an α-cellulose content of more than 65%, and a polymerization degree of the cellulose of between 500 to 1500.

In addition, regarding the graphene natural cellulose fibers made in step (m), each fiber can have a strength of 3.0 g/d to 5.0 g/d, an elongation of 4.0% to 8.0% and Young's modulus of 50 g/d to 150 g/d.

EXAMPLES

To further prove the features and the implementation effectiveness of the present invention, various test examples were completed and they are described as follows.

The present invention provides a "method of preparing natural graphene cellulose blended fiber", which comprises steps:

Example 1

(a) Adding sulfuric acid ($H_2SO_4$) in a graphite powder, which comprises pouring graphite powder 1.0 g into 250 ml beaker, and under ice-cooling environment, adding 23 ml of sulfuric acid, then stirring it for 30 minutes;

(b) Adding potassium permanganate ($KMnO_4$), which comprises: adding a potassium permanganate 4.0 g into a mixture obtained from step (a), stirring it for 1 to 2 hours, and adding an appropriate amount of distilled water, until that none of purple smoke which is generated by reacting with the potassium permanganate, is formed form the distilled water;

(c) Adding a hydrogen peroxide ($H_2O_2$) and conducting a filtration, which comprises: dropwisely adding 5.0% to 10.0% hydrogen peroxide in a solution obtained from step (b), where bubbles are formed from solution during the hydrogen peroxide-adding period, and the addition of hydrogen peroxide is continuously proceeded until that none of bubble is formed form the solution, simultaneously the solution is changed to a dark green solution; and then filtering the dark green solution into a cake;

(d) Rinsing the cake by hydrochloric acid and washing the cake by water till it becomes neutral, which comprises rinsing the cake by using 5.0% to 10.0% of HCl to remove sulfate ions, and then washing the cake by distilled water until it becomes neutral;

(e) Drying the cake to form a solid graphite oxide, which comprises drying the cake in an oven under 40° C. to 60° C. for 24 to 48 hours to obtain a dried solid graphite oxide;

(f) Adding distilled water to form a graphite oxide solution, which comprises adding dried graphite oxide 0.06 g into beaker, adding distilled water to 200 ml, and then treating it by ultrasonic vibration for 30 to 60 minutes to obtain a graphite oxide solution, which has a concentration of 0.03 wt. %;

(g) Adding sodium borohydride ($NaBH_4$) to form a sodium borohydride containing graphene solution, which comprises adding 0.06 g of sodium borohydride ($NaBH_4$) with a concentration of 1 wt. % to 10 wt. % into the a graphite oxide solution of step (f) and then treating it by ultrasonic vibration for 30 to 60 minutes, thereby a sodium borohydride containing graphene solution is obtained;

(h) Conducting filtration, water-washing and back-filtration to form a graphene solution, which comprises firstly filtrating a sodium borohydride containing graphene solution by filter paper, after the filtration is finished, then washing it by water for 3 to 5 times to remove sodium borohydride, and finally back-filtrating the filter paper to obtain a graphene solution;

(i) Adding the graphene solution into a slurry solution formed by mixing and dissolving a wood pulp with a N-methylmorpholine N-oxide (referred to as NMMO), which comprises firstly cutting a raw material of wood pulp with a polymerization degree 650 into a small pieces, then putting it together with NMMO and stabilizer in an expansion dissolving tank, as well as mixing and stirring therein, whereas the tank should be heated to keep a constant temperature of between 60 to 80° C., and is equipped with a vacuum condensation device for removing water, wherein the graphene solution is added in a ratio of 0.01 wt. % to 3.0 wt. %.

(j) Removing water from a co-mixture of graphene and natural cellulose to form a spinning dope, which comprises removing surplus water content by using a Thin Film Evaporator (TFE), heating in 80 to 130° C., whereas water is removed to 5% to 13% within 5 minutes, thereby the cellulose is dissolved to form a spinning dope;

(k) Spinning the spinning dope by using a Dry-Jet Wet Spinning method, which comprises pressuring the spinning dope by a metering pump, transporting the spinning dope into a spinning tank after filtration and degassing by a continuous filter (CPF), forming a thin molten stream of the spinning dope while passing through a spinning orifice, and extruding the spinning dope through an air gap to form fibers;

(l) Delivering air-cured fibers into a coagulation bath to proceed a process of coagulation, regeneration and washing, wherein coagulation liquid has a concentration of 4.5% to 8.0%, and amount of the residual NMMO solvent remained after washing, is less than 0.1%; and (m) After coagulation, regeneration and washing are completed, then treating the spinned fibers by drying, oiling and winding process, and a graphene nature cellulose fiber is thus prepared; the fibers sample obtained as above are shown as Sample No. 1 to 9 in Table 1.

Example 2

(a) Adding sulfuric acid ($H_2SO_4$) in a graphite powder, which comprises pouring graphite powder 1.0 g into 250 ml beaker, and under ice-cooling environment, adding 23 ml of sulfuric acid, then stirring it for 30 minutes;

(b) Adding potassium permanganate ($KMnO_4$), which comprises: adding a potassium permanganate ($KMnO_4$) 4.0 g into a mixture obtained from step (a), stirring it for 1 to 2 hours, and adding an appropriate amount of distilled water, until that none of purple smoke which is generated by reacting with the potassium permanganate, is formed form the distilled water;

(c) Adding a hydrogen peroxide ($H_2O_2$) and conducting a filtration, which comprises: dropwisely adding 5.0% to 10.0% hydrogen peroxide ($H_2O_2$) in a solution obtained from step (b), where bubbles are formed from solution during the hydrogen peroxide-adding period, and the addition of hydrogen peroxide is continuously proceeded until that none of bubble is formed form the solution, simultaneously the solution is changed to a dark green solution; and then filtering the dark green solution into a cake;

(d) Rinsing the cake by hydrochloric acid and washing the cake by water till it becomes neutral, which comprises rinsing the cake by using 5.0% to 10.0% of HCl to remove sulfate ions, and then washing the cake by distilled water until it becomes neutral;

(e) Drying the cake to form a solid graphite oxide, which comprises drying the cake in an oven under 40 to 60° C. for 24 to 48 hours to obtain a dried solid graphite oxide;

(f) Adding distilled water to form a graphite oxide solution, which comprises adding dried graphite oxide 0.06 g into a beaker, adding distilled water to 200 ml, and then treating it by ultrasonic vibration for 30 to 60 minutes to obtain a graphite oxide solution, which has a concentration of 0.03 wt. %;

(g) Adding sodium borohydride ($NaBH_4$) to form a sodium borohydride containing graphene solution, which comprises adding 0.06 g of sodium borohydride ($NaBH_4$) with a concentration of 1 wt. % to 10 wt. % into the a graphite oxide solution of step (f) and then treating it by ultrasonic vibration for 30 to 60 minutes, thereby a sodium borohydride containing graphene solution is obtained;

(h) Conducting filtration, water-washing and back-filtration to form a graphene solution, which comprises firstly filtrating a sodium borohydride containing graphene solution by filter paper, after the filtration is finished, then washing it by water for 3 to 5 times to remove sodium borohydride, and finally back-filtrating the filter paper to obtain a graphene solution;

(i) Adding the graphene solution into a slurry solution formed by mixing and dissolving a wood pulp with a N-methylmorpholine N-oxide (referred to as NMMO), which comprises firstly cutting a raw material of wood pulp with a polymerization degree 1050 into a small pieces, then putting it together with NMMO and stabilizer in an expansion dissolving tank, as well as mixing and stirring therein, whereas the tank should be heated to keep a constant temperature of between 60 to 80° C., and is equipped with a vacuum condensation device for removing water, wherein the graphene solution is added in a ratio of 0.01 wt. % to 3.0 wt. %.

(j) Removing water from a co-mixture of graphene and natural cellulose to form a spinning dope, which comprises removing surplus water content by using a Thin Film Evaporator (TFE), heating in 80 to 130° C., whereas water is removed to 5% to 13% within 5 minutes, thereby the cellulose is dissolved to form a spinning dope;

(k) Spinning the spinning dope by using a Dry-Jet Wet Spinning method, which comprises pressuring the spinning dope by a metering pump, transporting the spinning dope into a spinning tank after filtration and degassing by a continuous filter (CPF), forming a thin molten stream of the spinning dope while passing through a spinning orifice, and extruding the spinning dope through an air gap to form fibers;

(l) Delivering air-cured fibers into a coagulation bath to proceed a process of coagulation, regeneration and washing, wherein coagulation liquid has a concentration of 4.5% to 8.0%, and amount of the residual NMMO solvent remained after washing, is less than 0.1%; and (m) After coagulation, regeneration and washing are completed, then treating the spinned fibers by drying, oiling and winding process, and a graphene nature cellulose fiber is thus prepared; the fibers sample obtained as above are shown as Sample No. 10 to 18 in Table 1.

TABLE 1

Compositions of each raw spinning solution of various samples

| Sample | Polymerization degree of cellulose | Blending ratio of graphene solution (wt. %) | Amount of cellulose (%) | Amount of solvent (%) | Amount of Water (%) |
|---|---|---|---|---|---|
| 1 | 650 | 0.01 | 12.2 | 78.2 | 9.6 |
| 2 | 650 | 0.05 | 12.1 | 78.5 | 9.4 |
| 3 | 650 | 0.08 | 12.3 | 79.1 | 8.6 |
| 4 | 650 | 0.11 | 12.6 | 78.4 | 9.0 |
| 5 | 650 | 0.5 | 12.4 | 78.5 | 9.1 |
| 6 | 650 | 0.8 | 12.4 | 78.1 | 9.5 |
| 7 | 650 | 1.0 | 12.3 | 78.7 | 9.0 |
| 8 | 650 | 2.0 | 12.0 | 78.5 | 9.5 |
| 9 | 650 | 3.0 | 12.4 | 78.4 | 9.2 |
| 10 | 1050 | 0.01 | 12.4 | 79.3 | 8.3 |
| 11 | 1050 | 0.05 | 12.7 | 79.2 | 8.1 |
| 12 | 1050 | 0.08 | 12.6 | 78.7 | 8.7 |
| 13 | 1050 | 0.11 | 12.3 | 78.0 | 9.7 |
| 14 | 1050 | 0.5 | 12.2 | 79.2 | 8.6 |
| 15 | 1050 | 0.8 | 12.4 | 78.5 | 9.1 |
| 16 | 1050 | 1.0 | 12.7 | 78.3 | 9.0 |
| 17 | 1050 | 2.0 | 12.3 | 78.3 | 9.4 |
| 18 | 1050 | 3.0 | 12.0 | 78.9 | 9.1 |

The fibers samples obtained as above Samples No. 1 to 18 are further evaluated by an assessment of antistatic property and thermal conductivity.

Example 3 (Antistatic Performance Test)

Antistatic performance is tested according to FTTS-FA-009 (Specified Requirement of Antistatic Textile, and with reference to the standard of AATCC76 (Electrical Resistivity Fabrics) by using concentric electrode surface resistance meters, and the surface resistance value of each sample, the half-life of charge recession and frictional-charged electrostatic potential are tested to evaluate the antistatic effect of the graphene-natural cellulose blended fibers. Results of antistatic performance test made to each of the fibers Samples No. 1 to 18 are shown in Table 2.

TABLE 2

Antistatic Performance Test of natural graphene cellulose blended fibers

| Sample | Polymerization degree of cellulose | Blending ratio of graphene solution (wt. %) | Surface Resistance (Ω) | half-life of charge recession (sec.) | frictional-charge electrostatic potential (V) | Test result (grade) |
|---|---|---|---|---|---|---|
| 1 | 650 | 0.01 | $9.44 \times 10^9$ | <0.1 | 265 | 1 |
| 2 | 650 | 0.05 | $7.32 \times 10^9$ | <0.1 | 218 | 1 |
| 3 | 650 | 0.08 | $5.05 \times 10^9$ | <0.1 | 212 | 1 |
| 4 | 650 | 0.11 | $1.66 \times 10^8$ | <0.01 | 142 | 2 |
| 5 | 650 | 0.5 | $4.32 \times 10^7$ | <0.01 | 85 | 2 |
| 6 | 650 | 0.8 | $6.54 \times 10^6$ | <0.01 | 69 | 2 |
| 7 | 650 | 1.0 | $4.02 \times 10^6$ | <0.01 | 62 | 2 |
| 8 | 650 | 2.0 | $1.78 \times 10^6$ | <0.01 | 57 | 2 |
| 9 | 650 | 3.0 | $1.02 \times 10^5$ | <0.01 | 54 | 2 |
| 10 | 1050 | 0.01 | $9.23 \times 10^9$ | <0.1 | 242 | 1 |
| 11 | 1050 | 0.05 | $7.05 \times 10^9$ | <0.1 | 211 | 1 |
| 12 | 1050 | 0.08 | $5.64 \times 10^9$ | <0.1 | 204 | 1 |
| 13 | 1050 | 0.11 | $1.52 \times 10^8$ | <0.01 | 147 | 2 |
| 14 | 1050 | 0.5 | $4.30 \times 10^7$ | <0.01 | 88 | 2 |
| 15 | 1050 | 0.8 | $6.56 \times 10^6$ | <0.01 | 67 | 2 |
| 16 | 1050 | 1.0 | $4.12 \times 10^6$ | <0.01 | 59 | 2 |
| 17 | 1050 | 2.0 | $1.84 \times 10^6$ | <0.01 | 55 | 2 |
| 18 | 1050 | 3.0 | $1.09 \times 10^5$ | <0.01 | 52 | 2 |

According to the results as shown in Table 2, it is known: when blending ration of graphene came to 0.11 wt. %, the test result will become Grade 2. The test result of Grade 2 means that its antistatic effect is considered as in a level of "good". Further, the surface resistance of fibers will be also enlarged accompany with the increase in concentration of graphene added therein. Furthermore, the natural graphene cellulose blended fibers prepared by the present invention has an antistatic performance much higher than that of general wood pulp cellulose fibers sold in market.

Example 4 (Thermal Conductivity Performance Test)

The thermal conductivity of natural cellulose fibers is lower in comparison. Results of thermal conductivity performance test made to each of Samples No. 1 to 18 of the natural graphene cellulose blended fibers prepared by the present invention are shown in Table 3.

TABLE 3

Thermal Conductivity Performance Test of natural graphene cellulose blended fibers

| Sample | Polymerization degree of cellulose | Blending ratio of graphene solution (wt. %) | Thermal conductivity coefficient (W/m · K) |
|---|---|---|---|
| 1 | 650 | 0.01 | 0.53 |
| 2 | 650 | 0.05 | 0.79 |
| 3 | 650 | 0.08 | 0.82 |
| 4 | 650 | 0.11 | 0.88 |
| 5 | 650 | 0.5 | 0.93 |
| 6 | 650 | 0.8 | 1.05 |
| 7 | 650 | 1.0 | 1.13 |
| 8 | 650 | 2.0 | 1.39 |
| 9 | 650 | 3.0 | 1.57 |
| 10 | 1050 | 0.01 | 0.47 |
| 11 | 1050 | 0.05 | 0.63 |
| 12 | 1050 | 0.08 | 0.78 |
| 13 | 1050 | 0.11 | 0.86 |
| 14 | 1050 | 0.5 | 0.96 |
| 15 | 1050 | 0.8 | 1.10 |
| 16 | 1050 | 1.0 | 1.25 |
| 17 | 1050 | 2.0 | 1.36 |
| 18 | 1050 | 3.0 | 1.62 |

According to the results as shown in Table 3, it is known: each of the natural graphene cellulose blended fibers prepared by the present invention has thermal conductivity coefficient higher than that of general synthesis fiber sold in market, and the thermal conductivity coefficient will be also enlarged accompany with the increase in amount of graphene, and there by the thermal conductivity performance is also upgraded.

In summary, according to the present invention, since a natural graphene cellulose blended fiber is prepared by adding the graphene solution to a slurry formed by mixing and dissolving a wood pulp with N-methylmorpholine N-oxide (NMMO), removing the water content thereof to form a spinning dope, and then spinning the spinning dope by a Dry-Jet Wet method, thereby there is no need of either a processing procedure including a reduction process, or use of a highly toxic hydrazine hydrate solution which is required in a reduction process, and no occurrence of health hazards such as dizziness, nausea and others resulting from operator exposure through inhalation or skin contact with a highly toxic hydrazine hydrate solution, and thus the preparation method provided by the present invention is a safe and harmless process as to operators. Further, by increasing the adding ratio of the graphene solution in the manufacturing process, the antistatic performance and thermal conductivity function of the natural graphene cellulose blended fiber can be controlled, and thereby various consumers' requirements for antistatic properties and thermal conductivity functions can also be satisfied. Besides, the present fibers can decompose naturally upon disposal after use. For at least these reasons, the present product is a harmless, natural and environmentally friendly fiber and should be considered as a novel invention with excellent potential capabilities in various real applications.

What is claimed is:

1. A method of preparing natural graphene cellulose blended fiber, which comprises the following steps:
   (a) combining a graphite powder with a solution comprising 1 to 10 wt % of a first compound selected from the group consisting of sulfuric acid ($H_2SO_4$), hydrochloric acid (HCl), perchloric acid ($HClO_4$), hydrogen iodide (HI), hydrofluoric acid (HF), and nitric acid ($HNO_3$), then stirring for 30 minutes in an ice bath environment;
   (b) adding a solution comprising 1 to 10 wt. % potassium permanganate ($KMnO_4$) to the product of step (a), stirring for 1 to 2 hours, and adding distilled water, wherein a stoichiometric amount of the potassium permanganate solution is added until reaction of the potassium permanganate and the product of step (a) and the distilled water is complete;
   (c) adding a solution comprising 1 to 10 wt. % hydrogen peroxide ($H_2O_2$) to the product of step (b), wherein a stoichiometric amount of the hydrogen peroxide solution is added until reaction between the hydrogen peroxide and the product of step (b) is complete and the solution becomes green, then filtering the green solution into a cake;
   (d) rinsing the cake of step (c) with a solution comprising 5 to 10 wt. % hydrochloric acid to remove sulfate ions, then washing the cake with distilled water;
   (e) drying the product of step (d) at 40 to 60° C. for 24 to 48 hours to obtain dried solid graphite oxide;
   (f) adding distilled water to the dried solid graphite oxide of step (e), wherein the distilled water is added up to 200 mls per 0.06 g to 1.0 g of the dried solid graphite oxide, then treating by ultrasonic vibration for 30 to 60 minutes to obtain a graphite oxide solution having a graphite oxide concentration of 0.03 to 0.5 wt. %;
   (g) adding a solution comprising 1 wt. % to 10 wt. % of a second compound selected from the group consisting of sodium borohydride ($NaBH_4$), potassium borohydride ($KBH_4$), lithium aluminum hydride ($LiAlH_4$), and sodium citrate ($C_6H_5Na_3O_7$) to the graphite oxide solution of step (f), then treating by ultrasonic vibration for 30 to 60 minutes;
   (h) filtrating the product of step (g), washing the filtrate with water 3 to 5 times to remove the sodium borohydride, potassium borohydride, lithium aluminum hydride, or sodium citrate, then back-filtrating to obtain a graphene solution;
   (i) adding the graphene solution of step (h) to a slurry solution formed by mixing a pulp with N-methylmorpholine N-oxide (NMMO) and a stabilizer in an expansion dissolving tank, then mixing at 60 to 80° C., wherein the graphene solution is added in a ratio of 0.11 wt. % to 5.0 wt. %, the pulp is selected from the group consisting of wood pulp, cotton pulp, bamboo pulp, and a mixture of cotton and bamboo pulp, the pulp comprises α-cellulose in an amount of 65% or more having a polymerization degree of 500 to 1500, and the NMMO has a concentration of 50 to 78%;
   (j) removing water from the product of step (i) using a Thin Film Evaporator (TFE) and heating at 80 to 130° C., wherein the water is removed to 5% to 13% within 5 minutes and the cellulose is dissolved to form a spinning dope;
   (k) spinning the spinning dope of step (j) using a Dry-Jet Wet Spinning method, which comprises pressuring the spinning dope by a metering pump, filtering and degassing by a continuous filter (CPF), transporting the spinning dope into a spinning tank, forming a thin molten stream of the spinning dope by passing the spinning dope through a spinning orifice, then extruding the spinning dope through an air gap to form air-cured fibers;
   (l) delivering the air-cured fibers of step (k) into a coagulation bath, then regenerating and washing the fibers, wherein the coagulation bath has a concentration of 4.5 to 8.0%, and the amount of residual NMMO solvent remaining after washing is less than 0.1%; and
   (m) drying, oiling and winding the product of step (l) to form natural graphene cellulose blended fibers.

2. The method of claim 1, wherein in step (a) the first compound is sulfuric acid.

3. The method of claim 1, wherein in step (g) the second compound is sodium borohydride.

4. The method of claim 1, wherein in step (i) the expansion dissolving tank is equipped with a vacuum condensation device for removing water.

5. The method of claim 1, wherein in step (i) the pulp is wood pulp.

6. The method of claim 5, wherein the wood pulp is selected from the group consisting of long-fiber pulp (soft wood pulp), short-fiber pulp (hard wood pulp), and a combination thereof.

7. The method of claim 1, wherein the natural graphene cellulose blended fibers of step (m) each have a strength of 3.0 g/d to 5.0 g/d, an elongation of 4.0% to 8.0% and a Young's modulus of 50 g/d to 150 g/d.

* * * * *